United States Patent [19]
DeWitt, Jr.

[11] 4,147,924
[45] Apr. 3, 1979

[54] TORTILLA WARMER

[76] Inventor: Charles M. DeWitt, Jr., 103 Marchmont, San Antonio, Tex. 78213

[21] Appl. No.: 822,715

[22] Filed: Aug. 8, 1977

[51] Int. Cl.² ............................................ F27D 11/02
[52] U.S. Cl. .................................... 219/417; 99/339; 99/417; 219/401; 219/415; 219/430; 219/431; 219/432; 219/439; 219/445; 219/462
[58] Field of Search ............... 219/214, 218, 401, 415, 219/416, 417, 418, 419, 430, 431, 432, 438, 439, 440, 445, 446, 462, 464, 524, 525; 99/337, 339, 417

[56] References Cited

U.S. PATENT DOCUMENTS

| | | | |
|---|---|---|---|
| 1,946,886 | 2/1934 | Schramm, Jr. | 99/339 X |
| 2,182,682 | 12/1939 | Shroyer | 219/417 |
| 2,257,580 | 9/1941 | Trompeter | 219/418 |
| 2,527,566 | 10/1950 | Miller | 219/418 |
| 2,601,546 | 6/1952 | Miller | 219/418 |
| 2,719,211 | 9/1955 | Lewis et al. | 219/415 X |
| 2,818,794 | 1/1958 | Aslesen | 219/401 X |
| 2,973,705 | 3/1961 | Klemm | 99/337 |
| 3,454,745 | 7/1968 | Stone | 219/415 |
| 3,808,963 | 5/1974 | Ludena | 99/417 |
| 4,013,869 | 3/1977 | Orts | 219/401 |

*Primary Examiner*—Volodymyr Y. Mayewsky
*Attorney, Agent, or Firm*—Gunn & Lee

[57] ABSTRACT

The present invention is an apparatus for use at the dining table to provide a continuous supply of hot tortillas. An elongated housing has two openings in the top thereof with a first opening having a resistive heating element contained therein, and the second opening receiving a ceramic vessel therein. The ceramic vessel is maintained at an elevated temperature, either from the heat of the resistive heating element or from a separate heating unit. The ceramic vessel is basically cylindrical with an upper opening closed by a cover having a reservoir to receive water. The water is converted and transmitted as steam through passages in the cover to the inside of the ceramic vessel thereby helping maintain moisture content of the hot tortillas.

5 Claims, 2 Drawing Figures

TORTILLA WARMER

BACKGROUND OF THE INVENTION

This invention relates to an apparatus for providing a continuous supply of hot tortillas and, more particularly, to an apparatus that may be used at the dining table for heating and maintaining the heat of tortillas.

BRIEF DESCRIPTION OF THE PRIOR ART

Tortillas are primarily made from either flour or corn, and are consumed in large quantities with a typical Spanish or Mexican meal. Tortillas are always served hot and typically envelope other foods, such as taco. During the meal, the tortillas may also be used in much the same manner as bread is used in typical Anglo culture. Normally, tortillas are consumed throughout the entirety of the meal whenever hot food is served.

In the typical Mexican-American household, tortillas are only eaten if hot. Normally, the amount of tortillas consumed would diminish directly with heat loss from the tortillas being served. A lukewarm tortilla is only eaten if a hot tortilla is not available. A cold tortilla is normally reheated. Due to the thin composition of tortillas, a tortilla will loose heat very rapidly. In order to maintain a hot supply of tortillas, tortillas are normally preheated and wrapped in a cloth at the dining table. Once the supply of tortillas is gone, or as is more often the case, the supply has grown cold, the preparer of the meal will return to the stove and begin warming tortillas. If several people are eating, the supplying of hot tortillas for the meal is a continuous activity normally resulting in one individual having to constantly heat tortillas for the other individuals eating. The individual preparing and serving the hot tortillas normally has to eat after everyone else, and many times with cold tortillas.

Many devices have been proposed in the past for heating and/or humidifying dry, cold tortillas, such as U.S. Pat. No. 4,013,869. However, none of the prior devices can be used at the dining table for the continuous operation of supplying hot tortillas without the normal interruption of the meal. For example, in U.S. Pat. No. 4,013,869, a group of tortillas would have to be placed in the cylindrical pot at one time, and thereafter be given a period of time to heat. With the present apparatus, a cold tortilla can be very quickly heated, and either eaten immediately or stored in a heat maintaining container for later consumption without anyone leaving the dining table.

SUMMARY OF THE INVENTION

It is an object of the present invention to provide an apparatus for continuously supplying hot tortillas during a meal without the inconvenience or disruption of anyone leaving the dining table.

It is another object of the present invention to provide an apparatus that may be used at the dining table which can both heat cold tortillas, and maintain heated tortillas at a hot temperature. The apparatus includes a resistive heating element for heating cold tortillas and a ceramic vessel in which the hot tortillas may be maintained at a high temperature. The ceramic vessel further includes a reservoir to receive water therein which supplies humidity to the inside of the ceramic vessel to prevent the tortillas from becoming dry. The ceramic vessel may either be heated from the resistive heating element or may have a separate heating element adjacent thereto. The housing in which the resistive heating element and ceramic vessel are located is made from an insulation material to prevent burning of anyone touching the housing. Insulated spacers rigidly maintain the heating element in a fixed position. The resistive heating element is at least as large as a standard tortilla of approximately 5 ½ to 6 inches diameter, and the ceramic vessel is generally cylindrical with a diameter of approximately 6 inches so that hot tortillas may be stacked therein.

DESCRIPTION OF THE PREFERRED EMBODIMENT

Figure 1:
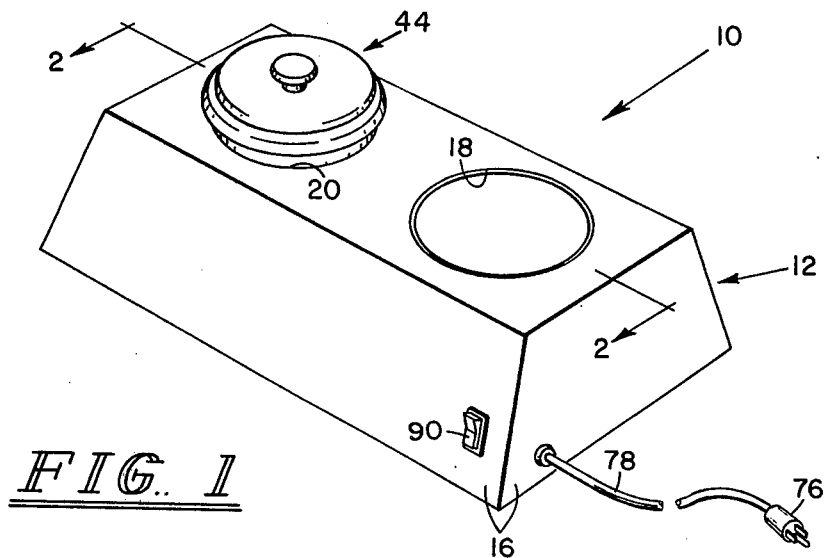
FIG. 1 is a perspective view of a tortilla warmer.

Referring to FIG. 1, there is shown a tortilla warmer represented generally by reference numeral 10. The tortilla warmer 10, which is designed for use at the dining table, has an elongated, housing 12 which is a poor conductor of heat. The elongated, housing 12 has an upper surface 14 and sloping side walls 16. In the upper surface 14 is a pair of circular openings 18 and 20.

Figure 2:
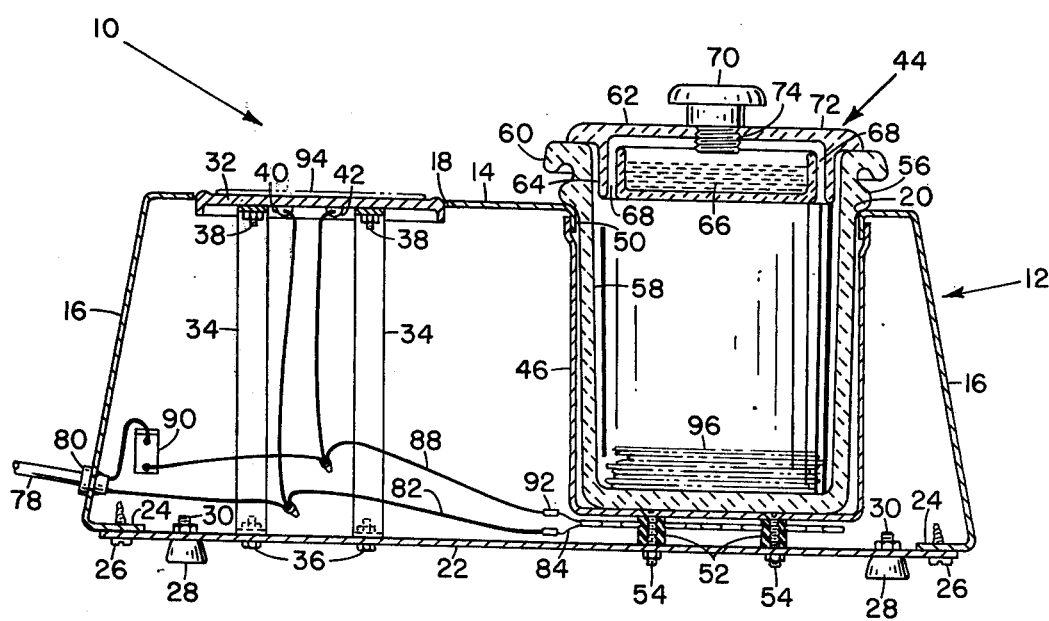
FIG. 2 is a cross-sectional view of FIG. 1 along section lines 2—2.

Referring to FIG. 2 in combination with FIG. 1, a base plate 22 is attached to a lower flange 24 of elongated, housing 12 by means of screw 26. The entire tortilla warmer is supported by rubber base supports 28 held in position by screws 30 extending through base 22.

Located in circular opening 18 is a resistive heating plate 32 that is held in position by non-electrically conductive mounting brackets 34 extending upwardly from base 22. The lower portion of the mounting bracket 34 is held in position by bolts 36. The upper portion of the non-electrically conductive mounting bracket 34 is attached to the resistive heating plate 32 by means of bolts 38.

While the type of resistive heating plate 32 may vary, a solid resistive heating plate similar to the type manufactured by ACRA Electric Corporation is desirable. For resistive heating plates having a solid upper surface, electrical connecting tabs 40 and 42 are formed as part of the resistive heating plate 32. The bolts 38 may be connected by any suitable means, such as bonding by a heat resistive epoxy. The resistive heating plate 32 should be slightly larger than the standard size tortilla, namely 5 ½ to 6 inches in diameter. The circular opening 18 is just large enough to receive the resistive heating plate 32 therein so that the resistive heating plate 32 is in the same plane as the upper surface 14 of the elongated, housing 12. It is desirable that the non-electrically conductive mounting brackets 34 either have a low conductivity of heat, or that an insulating spacer is located between the mounting brackets 34 and the resistive heating element 32.

Located in opening 20 of the upper surface 14 is a ceramic vessel 44. The crock 44 is received inside of cylinder 46 in a close contiguous relationship. The upper rim 48 of the cylinder 46 is flared outward to receive downward flange 50 from upper surface 14 to rigidly hold cylinder 46 in position. The bottom of cylinder 46 rests against insulating spacers 52. Flathead bolts 54 extend through the bottom of cylinder 46, insulating spacers 52 and base plate 22 to securely hold cylinder 46 in position.

While ceramic vessel 44 is designed to set against the bottom of cylinder 46, and in a close contiguous relationship with the sides thereof, the ceramic vessel 44 has an upper retaining stop 56 around the cylinder 58. The edge 60 of the cylinder 58 is formed outward and downward to provide a means for removing the ceramic vessel 44 from the cylinder 46.

The ceramic vessel 44 has a cover 62 with a downwardly extending center portion 64 being received inside of cylinder 58. The downwardly extending center portion 64 has a reservoir 66 with passages opening from the top of the reservoir 66 to the inside of cylinder 58. A non-heat conductive handle 70 is threadably connected into the top 72 of cover 62 through threadable opening 74. By unscrewing the non-heat conductive handle 70 from the cover 62, water may be poured into the reservoir 66. Thereafter, by screwing the handle 70 into the cover 62, the water is maintained in reservoir 66. Upon operation of the tortilla warmer, the ceramic vessel 44 is heated, as is subsequently described herein. The heat is conducted through the ceramic vessel 44 to the cover 62 and then to the water. A waterbearing vapor is produced thereby, which vapor travels through passages 68 in the cover 62 and into the ceramic vessel 44.

A suitable electric plug 76 connects standard AC power through chord 78 to the tortilla warmer 10. A rubber grommet 80 protects the chord 78 as it extends through the side of housing 12. A first lead 82 connects to electrical connecting tab 40 of the resistive heating plate 32 and to tab 84 of heating element 86. Heating element 86 is held in position by insulation spacers 52 immediately below the cylinder 46. A second lead 88 from the chord 78 connects through an ON/OFF switch 90 prior to connecting with electrical connecting tab 42 of the resistive heating plate 32 and tab 92 of heating element 86.

By plugging the electric plug 76 into a suitable AC outlet and turning the ON/OFF switch 90 to the ON position, the tortilla warmer 10 is ready for use. The tortilla 94 (shown in reference lines) is being heated by the resistive heating plate 32. Other tortillas 96 (shown in reference lines) have already been heated on resistive heating plate 32 and are being maintained hot, ready-to-serve inside of ceramic vessel 44. The cylinder 46 inside of which ceramic vessel 44 is located is made from a substance that is highly heat conductive, such as the basic metals. While cylinder 46 may receive some heat conduction from resistive heating plate 32, an additional heating element 86 may be necessary to raise the temperature of the cylinder 46 and the ceramic vessel 44 located therein to a higher temperature to maintain the tortillas 96 contained therein at hot, ready-to-serve temperature. As the ceramic vessel 44 heats, water contained in reservoir 66 will evaporate with the resulting steam flowing through passages 68 to the inside of ceramic vessel 44. The steam inside of ceramic vessel 44 will help maintain the tortillas 96 in a fresh condition so they will not become dry and hard while waiting to be served. The use of water in reservoir 66 is more important for corn tortillas than flour tortillas because flour tortillas normally have a lower moisture content from corn tortillas.

By use of the tortilla warmer 10 as just described, an individual while sitting at the dining table with other members of the dining party may continually supply hot tortillas to the individual diners by heating the tortillas on the resistive heating plate, and thereafter either serving the tortilla 94 or placing the hot tortilla inside of ceramic vessel 44 the same as tortillas 96. The tortillas 96 are maintained at a hot temperature so that if a tortilla is needed by an individual diner, by simply removing the cover 62, a hot tortilla 96 is immediately available.

I claim:

1. An apparatus for providing a continuous supply of hot tortillas at a dining table comprising:
   an enclosed housing having an upper surface, a base, and walls, said housing having a pair of openings in said upper surface;
   first resistive heating means in a first of said openings and in a plane with said upper surface, said resistive heating means being larger in diameter than a normal tortilla;
   power means for connecting said first resistive heating means to a source of electrical power;
   ceramic vessel means in a second of said openings, said ceramic vessel means being generally cylindrical in shape with a cross section being larger in diameter than said normal tortilla;
   second resistive heating means in close proximity to said ceramic vessel means;
   means for connecting said second resistive heating means to said source of electrical power;
   cover means for said ceramic vessel means for closing an upper opening of said ceramic vessel means;
   mounting means for holding said ceramic vessel means in place;
   reservoir means in said cover means adapted for receiving water therein, passages from said reservoir to a bottom side of said cover means allowing steam from said reservoir to pass to an inside of said ceramic vessel means; and
   handle means connected to said cover, said handle means being removable for providing a conduit to said reservoir for adding water thereto.

2. The apparatus as given in claim 1 comprising cylinder means inside said housing and below said second opening for receiving said ceramic vessel means therein in a close contiguous relationship.

3. The apparatus as given in claim 2 wherein said first resistive heating means is a solid, flat heating element.

4. The apparatus as given in claim 3 comprising insulating spacer means connected to said base for maintaining said first and second resistive heating means in position.

5. The apparatus as given in claim 4 comprising switching means mounted in said housing for applying said source of power to said first and second resistive heating means.

* * * * *